3,131,412
WINDSHIELD WIPER ARM
Michael J. McClain, Elmer E. Reese, and Thomas E. Stark, Rochester, N.Y., assignors to General Motors Corporation, Detroit, Mich., a corporation of Delaware
Filed Mar. 7, 1962, Ser. No. 178,208
7 Claims. (Cl. 15—250.35)

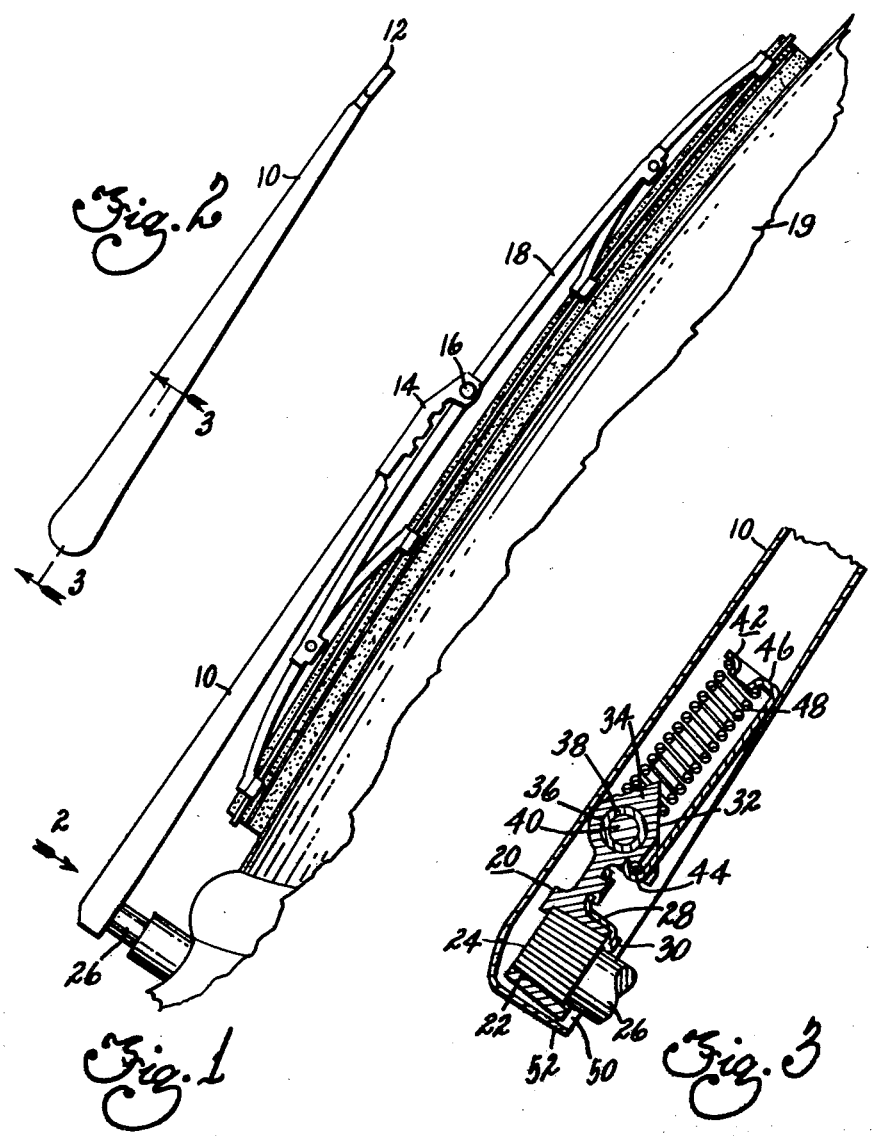

This invention pertains to windshield wiper arms, and particularly to an improved shrouded head windshield wiper arm assembly.

The majority of windshield wiper arms in current use comprise spring hinge connected inner and outer arm sections, the inner section being drivingly connected with a pivot shaft, the outer section carrying a wiper arm, both arm sections being exposed. In order to improve the over-all appearance of a windshield wiper arm assembly, and to present the appearance of a single piece wiper arm, the present invention relates to an improved shrouded head wiper arm assembly embodying a compression spring for biasing the arm extension towards an associated windshield. Accordingly, among our objects are the provision of an improved shrouded head wiper arm assembly; the further provision of a shrouded head wiper arm assembly embodying a compression spring assembly for biasing the arm towards an associated windshield; and the still further provision of a shrouded head wiper arm assembly embodying an integral seam welded tubular extension which wholly encloses the wiper arm head and carries the wiper blade.

The aforementioned and other objects are accomplished in the present invention by utilizing an integral seam welded stainless steel tubular extension which substantially encloses the wiper arm head and the pressure applying spring assembly, the tubular extension being pivotally connected to the wiper head by a joint which is not visible from the exterior thereof. Specifically, the tubular extension may be of the general type disclosed in copending application Serial No. 12,933 filed March 7, 1960, in the name of Eugene R. Ziegler and assigned to the assignee of this invention, and the pivot joint may be of the type disclosed in copending application Serial No. 178,200, filed in the name of Elmer E. Reese of even date herewith and of common assignee. The wiper arm head may comprise a die casting having a longitudinally serrated tapered socket for receiving a complementary serrated burr attached to the outer end of a pivot shaft. The arm head includes an integral radial extension having a transverse through bore and a conical spring seat. The through bore receives a sleeve bearing within which a pin is journalled, the ends of the pin projecting slightly beyond the ends of the sleeve bearing. A spring cage is pivotally attached to the arm head at a point radially inward of the sleeve bearing, and a compression spring is mounted between the conical spring seat and the outer arm of the spring cage.

The arm head and the spring assembly is substantially enclosed by a seam welded tubular outer arm extension, the outer end of the spring cage bearing against the inner lower wall of the tubular extension, and the projecting ends of the pin being projection welded to the inner surfaces of the side walls of the tubular extension whereby the compression spring will bias the tubular extension towards an associated windshield. The pivot joint between the tubular extension and the shrouded head is not visible from the exterior of the arm, thus enhancing the over-all appearance of the wiper arm. Likewise, the spring connection to the tubular extension is not visible from the exterior thereof. Pivotal movement between the tubular extension and the arm head is limited by suitable stops, and the arm head may embody a conventional spring latch for retaining it in assembled relation with the drive burr.

Further objects and advantages of the present invention will be apparent from the following description, reference being had to the accompanying drawing, wherein a preferred embodiment of the present invention is clearly shown.

In the drawing:

FIGURE 1 is a fragmentary view in elevation of a vehicle equipped with the improved wiper arm construction of this invention.

FIGURE 2 is a plan view of the improved wiper arm construction.

FIGURE 3 is an enlarged fragmentary sectional view taken along line 3—3 of FIGURE 2.

With reference to the drawing, the improved shrouded head wiper arm includes an integral seam welded tubular extension 10 having a terminal end 12 arranged for detachable connection to a clip 14 pivotally connected at 16 to the superstructure of a wiper blade 18 for moving it across the outer surface of an associated windshield 19. As is apparent from FIGURES 1 and 2, only the tubular extension 10, or outer section, is visible from the exterior of the wiper arm. However, as shown in FIGURE 3, the wiper arm also includes a die cast head, or socket section, 20 having a longitudinally serrated tapered socket 22 for receiving a complementary serrated drive burr 24 attached to the end of a pivot shaft 26. The head section 20 includes a spring latch 28 which extends through a side wall opening 30 into a socket recess 22 for engagement with the lower edge of the drive burr 24 so as to retain the parts in assembled relation. In addition, the head section 20 includes a radially extending portion 32 having a conical spring seat 34 and a transversely extending through bore 36. The through bore 36 receives a sleeve bearing 38 within which a pin 40 is journalled, the ends of the pin projecting slightly beyond the ends of the sleeve bearing 38.

In addition, a spring cage 42 comprising an elongate sheet metal member has its inner end pivotally mounted on a transversely extending pin 44 disposed radially inward of the pin 40 and attached to the radial extension 32 of the head section. The outer end of the spring cage 42 is angularly offset and formed as a spring seat 46. A compression spring 48 is mounted between the conical spring seat 34 and the spring seat 46. As seen particularly in FIGURE 3, the integral seam welded tubular extension 10 has a bottom wall opening 50 through which the head section and spring assembly can be inserted. When the head section and spring assembly are inserted therein, the projecting ends of the pin 40 are resistance welded to the inner surfaces of the side walls of the tubular extension 10 thereby rigidly interconnecting the tubular extension 10 and the pin 40 and establishing a pivot joint of remarkable structural integrity therebetween. The base of the spring cage 42 bears against the bottom wall of the tubular extension and thus biases the tubular extension in a clockwise direction, as viewed in FIGURE 3, about the head section 20 towards an associated windshield for applying the requisite wiping pressure to the wiper blade 18. The tubular extension 10 is adapted for limited angular movement relative to the shrouded head section 20, movement in the counterclockwise direction being limited by engagement of the end 52 of the extension 10 with the head section 20, and movement in the clockwise direction being limited by engagement of the top wall of the tubular extension 10 with the radial extension 32 adjacent the conical spring seat 34.

While the embodiment of the invention as herein disclosed constitutes a preferred form, it is to be understood that other forms might be adopted.

What is claimed is as follows:

1. A windshield wiper arm including, a head section adapted for attachment to an actuating shaft and having a radial extension, a single-piece tubular extension shrouding said head section, means pivotally interconnecting said sections for relative angular movement, a spring cage pivotally attached to said head section and extending radially outward therefrom, and a compression spring having one end engaging said head section and reacting between said head section and the outer end of said spring cage for biasing the tubular extension towards an associated windshield.

2. A windshield wiper arm including a head section adapted for attachment to an actuating shaft and having a radial extension, a spring seat on the outer end of said radial extension, a tubular outer section shrouding said head section, means pivotally interconnecting said tubular extension and said head section, and a compression spring having one end bearing on said spring seat and its other end operatively engaging said tubular section for biasing said tubular section towards an associated windshield.

3. A windshield wiper arm including, a head section adapted for attachment to a pivot shaft and having a radial extension, a conical spring seat on the outer end of said radial extension, a tubular outer arm section shrouding said head section, means pivotally interconnecting said outer section and said head section, a spring cage pivotally attached to said head section and extending radially outward therefrom, and a compression spring reacting between said spring seat and the outer end of said spring cage for biasing the outer arm section towards an associated windshield.

4. A windshield wiper arm including, a head section adapted for attachment to an actuating shaft and having a radially extending portion, a pin journalled in said radially extending portion, a tubular arm extension shrouding said head section, welds attaching the ends of said pin to the inner surfaces of the side walls of the tubular extension, a spring cage pivotally attached to said head section and extending radially outward therefrom, and compression spring means reacting between said head section and the outer end of said spring cage for biasing the tubular extension towards an associated windshield.

5. A windshield wiper arm including, a head section adapted for attachment to an actuating shaft and having a radially extending portion, a transverse bore through said radially extending portion, a sleeve bearing disposed in said transversely extending bore, a pin journalled in said sleeve bearing and having projecting ends, a tubular extension shrouding said head section, welds between the ends of said pin and the inner surfaces of the tubular extension for establishing a pivot joint between the head section and said tubular extension, and compression spring means engaging said radially extending portion and reacting between the head section and said tubular extension for biasing said tubular extension towards an associated windshield.

6. A windshield wiper arm including, a head section adapted for attachment to an actuating shaft and having a radially extending portion, a pin journalled in said radially extending portion, a conical spring seat at the outer end of said radially extending portion, a tubular extension shrouding said head section, welds rigidly interconnecting the ends of said pin and the inner surfaces of the side walls of said tubular extension to establish a pivot joint between said head section and said tubular extension, and a compression spring assembly reacting between said conical spring seat and said tubular extension for biasing said tubular extension towards an associated windshield.

7. The windshield wiper arm set forth in claim 6 wherein said compression spring assembly comprises a spring cage pivotally attached to the radially extending portion of said head section and extending radially outward therefrom into engagement with the bottom wall of said tubular extension, said spring cage having an offset spring seat at its outer end, and a compression spring arranged between the conical spring seat on said radially extending portion of said head section and the spring seat of said spring cage.

References Cited in the file of this patent

UNITED STATES PATENTS

| 3,088,154 | Riester | May 7, 1963 |

FOREIGN PATENTS

| 839,139 | Great Britain | June 29, 1960 |
| 848,754 | Germany | Sept. 8, 1952 |